Jan. 14, 1930.  E. R. FELLOWS  1,743,335
GEAR GENERATING MACHINE
Filed March 16, 1927   4 Sheets-Sheet 1
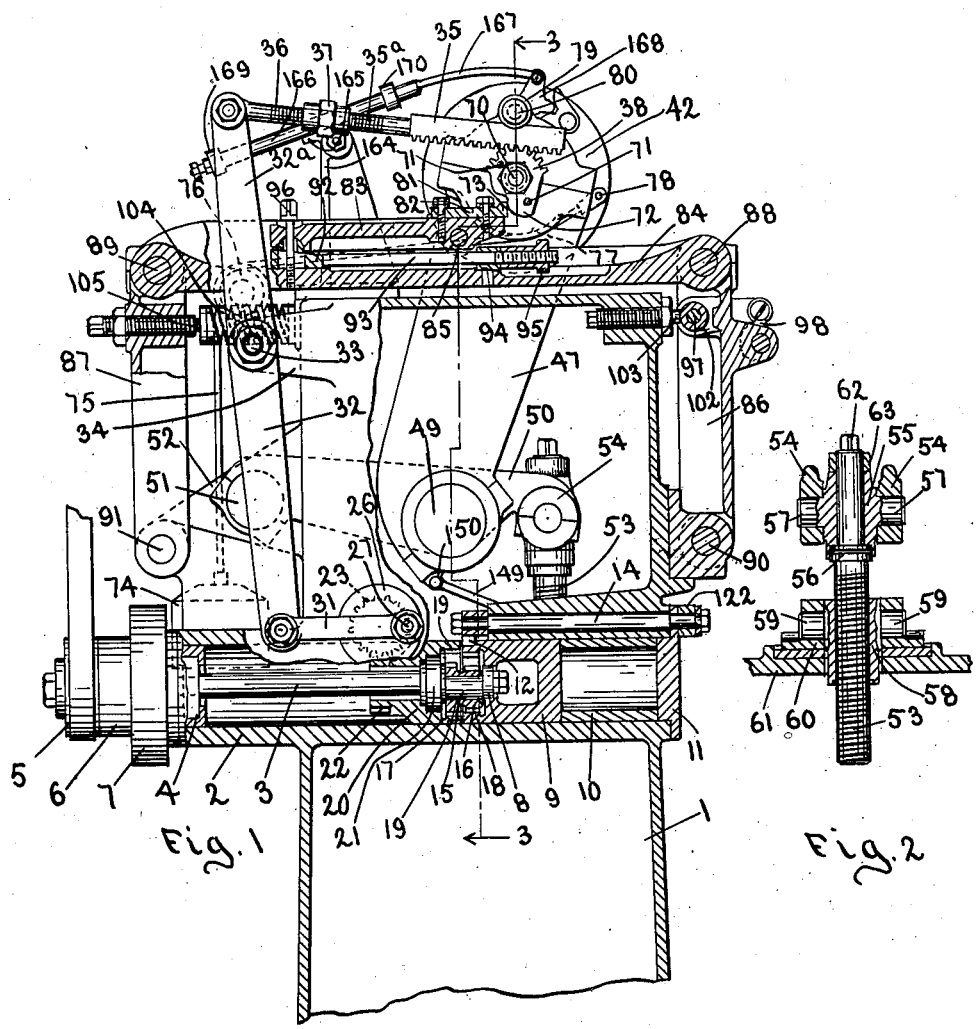
INVENTOR
Edwin R. Fellows

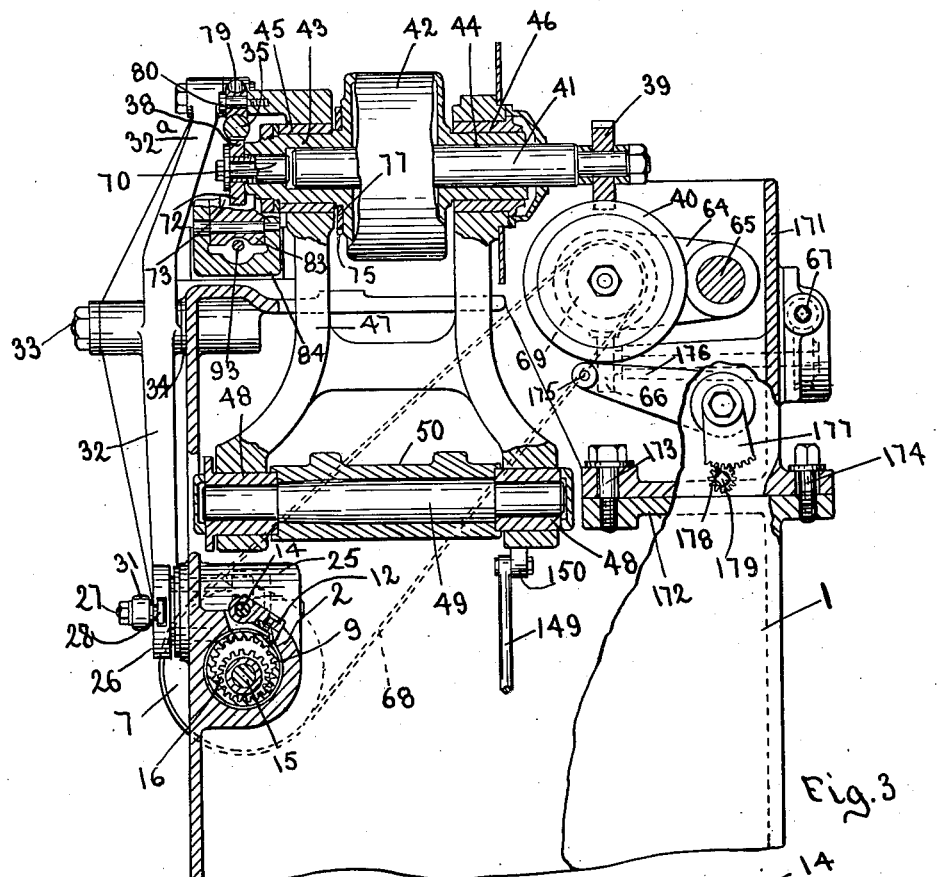

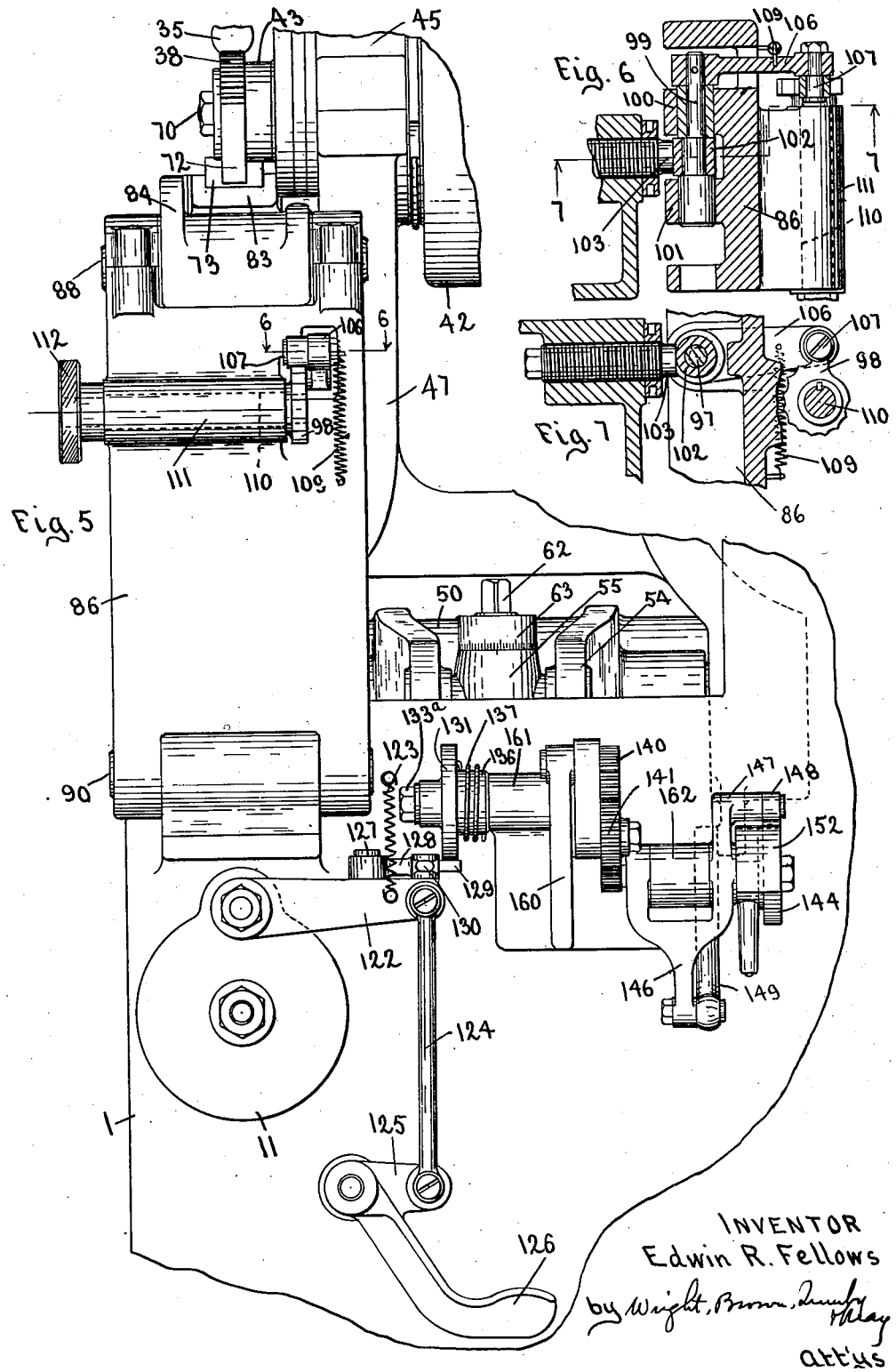

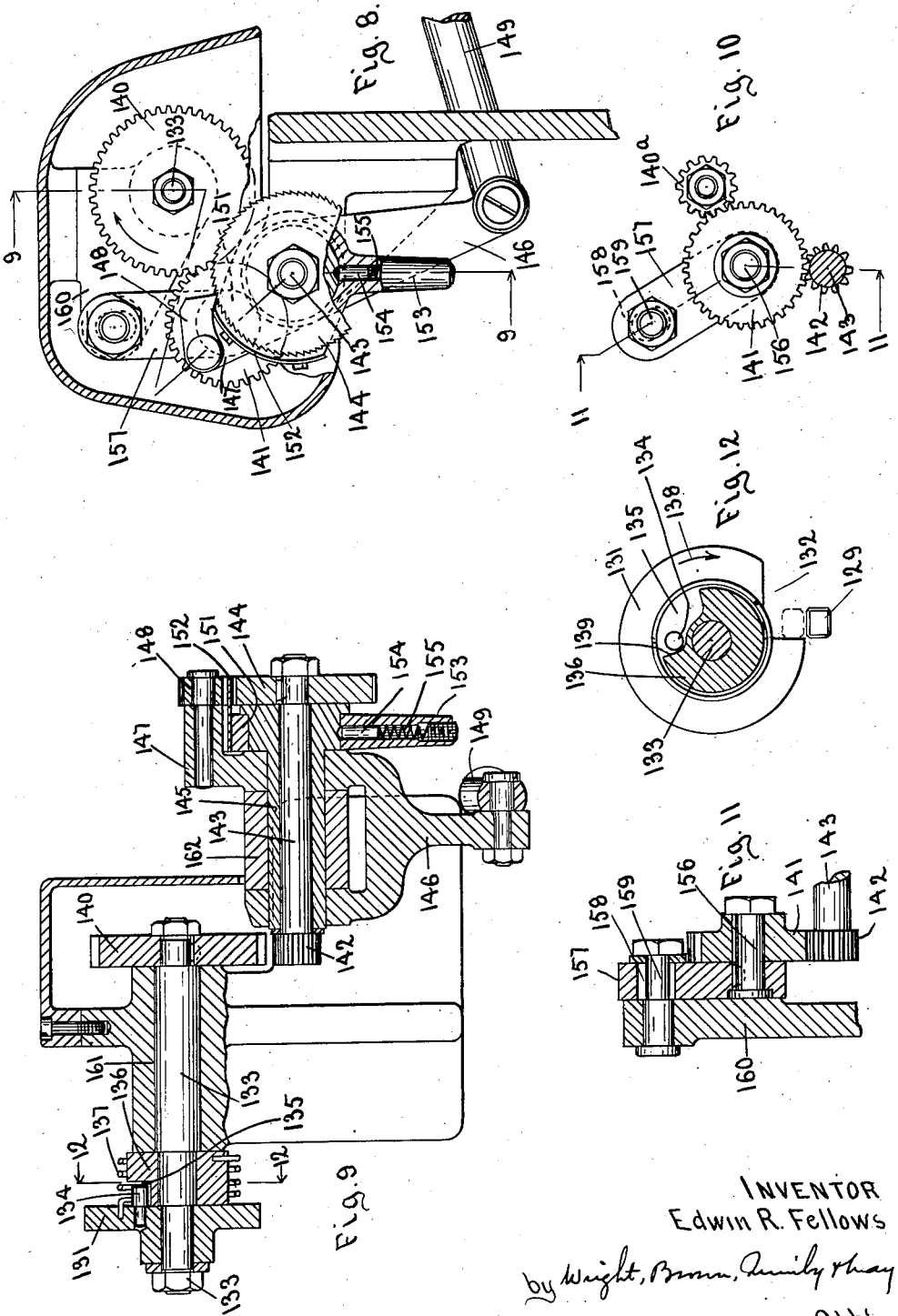

Patented Jan. 14, 1930

1,743,335

UNITED STATES PATENT OFFICE

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT

GEAR-GENERATING MACHINE

Application filed March 16, 1927. Serial No. 175,729.

The present invention relates to machines for finishing and generating the tooth faces of straight spur gears, helical gears, cutters for making such gears by the shaping process, and analogous forms, all comprehensively included within and designated by the term "gear teeth", for the purposes of this specification, preferably using as the tool for that purpose a grinding wheel made of a suitable abrasive material, over the active face of which the gear tooth is rolled while being controlled by a former and an abutment. While I have mentioned a grinding wheel as the preferred operating tool, it is to be understood that the principles of the invention and the protection which I claim are not limited to the use of such a tool exclusively. So far as the tool element of the machine is concerned, I may use any suitable cutting tool capable of operating on hardened or unhardened gear material, and adapted to perform the work and accomplish the results desired, wherefore the tool here shown is to be considered as typical of any operative tool. However, in the following specification I will for convenience generally refer to it as a grinding wheel.

The principal object of the invention is to provide a simplified machine for this purpose which, while having provisions or means for performing the work with the highest possible accuracy, and for effecting all necessary adjustments to work upon gears of different diameters and pitches or numbers of teeth, and to compensate for the effects of wear on rubbing surfaces, is yet of simple construction and embodies a smaller number of parts than machines heretofore produced having equivalent accuracy in the results accomplished. Further objects are to provide new means and constructions contributory to the foregoing main object, and to provide a new and improved mechanism for automatically stopping the machine when the work of grinding all, or a predetermined lesser number, of teeth of the gear has been completed.

The new features in which the invention consists and by which the foregoing objects are accomplished are explained in detail in the following specification with reference to the drawings.

In the drawings,—

Fig. 1 is a vertical longitudinal section of the preferred form of machine embodying the present invention;

Fig. 2 is a detail sectional view showing the means for adjusting the work carriage;

Fig. 3 is a cross section on line 3—3 of Fig. 2;

Fig. 3ª is a detail sectional view showing the detent by which the stopping and starting of the machine is controlled;

Fig. 4 is a detail sectional view showing the adjustable crank by which the movements for rolling the work are imparted to the work spindle;

Fig. 5 is a partial front elevation of the machine on a larger scale;

Fig. 6 is a detail cross section taken on line 6—6 of Fig. 5;

Fig. 7 is a section on line 7—7 of Fig. 6;

Fig. 8 is a detail elevation of the mechanism which operates the stopping detent;

Fig. 9 is a sectional view of the same mechanism on line 9—9 of Fig. 8;

Fig. 10 is a fragmentary detail of the mechanism shown in Fig. 8, illustrating the adjustment provided for accommodating changeable gears of different diameters in this mechanism;

Fig. 11 is a section on line 11—11 of Fig. 10;

Fig. 12 is a section on line 12—12 of Fig. 9.

Like reference characters designate the same parts wherever they occur in all the figures.

The base or frame 1 of the machine is made of any suitable construction and form to support and accommodate the various operative parts in the relationship hereinafter described. It may be made of a single metal casting or a number of castings fitted and secured together according to principles well understood by the machine designer and unnecessary to be illustrated or described in detail here. It includes a tubular shell 2 at an intermediate point in its height wherein are contained the primary parts of the driving mechanism.

The drive shaft 3 is located in the shell 2, being supported in the bearing 4 in one end of the shell, from which it protrudes and carries on its protruding end a fast driving pulley 5, a loose pulley 6, and a pulley 7 for driving the grinding wheel. The inner end of the shaft is supported in a bearing 8 held in a block 9 which fits rotatably within the shell 2 and is positioned by a lining sleeve 10 bearing against an end plate 11 which covers the opposite end of the shell from the pulleys. Block 9 is normally prevented from rotating by a dog or detent 12 adapted to obstruct a shoulder 13 on the exterior of the block. Said detent is mounted on a shaft 14, having a bearing in shell 2, whereby it is operable to clear and again obstruct shoulder 13, as later described.

The shaft 3 carries an eccentric crank pin 15 on which is mounted a connected pair of pinions 16 and 17 meshing, respectively, with an internal gear element 18 on a part of the block 9 surrounding pinion 16, and an internal gear element 19 surrounding pinion 17 on the adjacent end of a rotatably mounted gear body 20 having an external bearing in the shell 2 and an internal bearing at 21 on the drive shaft. The gear body carries also a gear element 22, which has a skew gear or worm meshing with a complemental skew gear or worm wheel 23 on a transverse shaft 24 suitably mounted in bearings in a shell 25 forming part of the base structure and of the shell 2.

The pinions 16 and 17 have different numbers of teeth and form, in connection with the internal gears 18 and 19 (which also have, respectively, different numbers of teeth), a planetary differential gearing transforming relatively rapid rotation of the drive shaft into relatively slow, powerful and uniform rotation of the gear 23 and of the shaft 24 on which said gear is mounted.

The shaft 24 carries a crank disk 26 outside of the frame, to which a crank pin 27 is adjustably mounted by means of a slide 28 carrying the pin and occupying a transverse guideway 29 in the disk, which slide is adjustable by a screw 30 mounted and rotatably held in the guideway and meshing with threads in the slide 28, whereby the throw of the crank pin may be accommodated to the needs or requirements of gears of different diameters and pitches. Crank pin 27 is connected to a link or connecting rod 31 which in turn is connected to a lever 32 mounted by a pivot 33 on a bracket 34 projecting from the machine frame. The arm 32$^a$ of lever 32 is connected with a rack bar 35 by means of a threaded stem 35$^a$ on said rack bar, an oppositely threaded bar 36 pivoted to the lever, and an internally threaded coupling nut or turn buckle 37 engaged with the threaded bars 35$^a$ and 36 and providing for adjustment of the rack endwise. The rack meshes with a gear segment 38 through which it imparts rolling movement to the work piece, under control of the former hereinafter described.

The work piece, in this case a spur gear wheel, is shown at 39 in Fig. 3, in operative relationship to a grinding wheel or equivalent generating cutter 40. It is secured to the work spindle 41 which passes through a housing 42 and has bearings in sleeves or quills 43 and 44 connected to or forming extension parts of the housing 42, and mounted to oscillate in bearings 45 and 46 in a carriage or work holder 47. Said work holder is a rigid frame having side members separated to admit the housing 42 between them and apertured to provide the bearings above mentioned. At their lower ends, said side members are apertured to receive bearing bushings 48, 48 which fit and turn upon the projecting pivot ends of a bar 49 secured in a work holder support 50. The support 50 is mounted at one end on a pivot 51 secured in a projecting part 52 of the frame, and its opposite end is adapted to be raised and lowered, being for this purpose connected to an adjusting screw 53. Its connection with the adjusting screw is made by two arms 54 on the support, which embrace a block 55, fitted to the screw 53 so that the latter may turn within it, and resting on a thrust bearing 56 on said screw. Block 55 has oppositely projecting trunnions 57 contained in bearings in the arms 54. It will be understood, and is indicated in the drawings, that the various bearings hereinbefore described are provided with separable cap pieces which are secured by screws, or bolts and nuts, in a manner well understood in the art, and therefore not necessary to be shown or described in detail in this specification.

The adjusting screw 53 is confined in a nut 58 having trunnions 59 fitted to bearings in a chair 60 resting on a horizontal web or shelf 61 which forms a part of the machine base. Nut 58 is free to oscillate about the pivot support afforded by its trunnions 59, and the axis of these trunnions is parallel to that of the trunnions 57, whereby the adjusting screw is free to assume any inclination required by the curvilinear motion of that end of the support 50 to which the screw is connected. As the connection between the work carrier 47 and the support 50 is at a substantial distance from the pivot 51 of the support, the movements given by the adjusting screw to the support serve to raise and lower the work holder as required to accommodate work pieces of different diameters. The upper end 62 of the screw is formed to receive a wrench, whereby it may be turned, and adjacent thereto is fitted a collar 63 carrying graduations on its outer surface and serving, in relation to a fixed mark on the adjacent surface of block 55, to measure the adjustments of the screw, as well as to retain the block 55 in place.

The grinding wheel is likewise adjustable for work pieces of different diameters, and for that purpose its shaft is mounted in a holder 64 pivoted to the frame by a fixed pivot bar 65, and the holder rests, at its side opposite to the work spindle, on a cam 66 capable of being rotated to adjust the wheel toward and away from the axis of the work by a shaft 67 in a housing on the outside of the base, connected by worm and wheel gearing with the shaft on which the cam 66 is secured, and adapted to be turned by a wrench applied to its protruding end. The grinding wheel is driven by a belt 68 at the rear of the machine passing around the pulley 7 and also around a pulley 69 on the shaft of the grinding wheel.

The gear segment 38 previously mentioned is mounted detachably on a stud 70 secured in the sleeve or quill 43, to which it is additionally secured by screws 71 passing into the end of this sleeve. Said gear segment is made in one piece with a formed machine element 72, which I have called a former, having a curved surface bearing a definite relationship to the form to be given to the gear tooth faces being ground. Such former bears against an abutment 73 which is fixed and normally stationary on the machine frame, although it may be adjusted as and for the purposes later described. The desired results of truth and accuracy in the finished work are most readily and simply obtained by using a wheel having a plane face, as the generating tool, and an abutment, also having a plane operative face. In such case the active face of the former is a similar curve to that designed to be given to the gear teeth; and when the gear tooth forms are involute curves, the face of the former is likewise an involute curve generated to the same base circle as that of the gear teeth. But in order to distribute the effect of wear due to rubbing of the former on the abutment, I prefer to cause the former to make contact with the abutment on a different part of the involute curve from that which forms the gear tooth face. That is, in all gears the involute tooth faces are near the base circle, and in many gears, perhaps the great majority, the tooth face curves extend all the way in to the base circle. But the corresponding parts of the involute curve in the former are the parts which, if caused to roll in contact with the abutment, have the greatest and most variable rubbing and wearing effects. In order to overcome these effects, I arrange the abutment with its active face parallel to, and somewhat to the rear of, the plane of the grinding wheel face, and so mount the former that the part of its face which bears on the abutment is considerably farther removed from the base circle point of the curve than are the involute faces of the gear to be ground from their base circle. Notwithstanding these displacements of the abutment and former, the correct rolling motion is given to the work with respect to the wheel.

Tooth curves in the work which are modified from the true involute may be obtained by the use of formers which are appropriately modified. Thus if the curve of the former departs in either direction from the involute of a given base circle, the curve produced in the work will have a corresponding departure from the involute. In this way gear teeth may be modified, for instance, near their points or roots, so as to secure quiet coming into and leaving mesh when afterwards put to use in connection with mating gears, and avoid noisy and clashing operation. And gears having other characteristic tooth forms than involute curves may likewise be ground upon this machine with use of appropriately shaped formers and possibly also by modifying the forms of the abutment and the grinding wheel face. Moreover, all of these results are obtainable with the use of a former which is not similar in form or genesis to the work, provided an abutment complementally modified to accomplish the desired effect is used.

It will be readily apparent from the foregoing description of structure and arrangement that as the main shaft 3 is rotated at a sufficiently high speed, the grinding wheel is driven at the efficient grinding speed and the rack bar 35 is reciprocated at a relatively slow speed. In its reciprocations, it turns the gear segment 38, and thereby the work spindle 41 and the work piece thereon back and forth. At the same time, the former 72, pressing against the abutment 73, rolls upon the face of the abutment and causes the entire work holder 47 to be oscillated about the pivot 49, thereby giving a translative movement to the work spindle and causing the tooth of the work piece in process of grinding to be rolled past the grinding wheel in the manner of a gear rolling in mesh with a stationary conjugate rack tooth. The former is held in contact with the abutment by a weight 74 suspended by a cord or the like 75 which passes around a guide pulley 76 and under a segment 77 coaxial with the housing 42 and secured thereto, to a point of attachment at 78 with the housing. The rack is prevented from leaving its mesh with the gear segment 38 by an overlying guide roll 79 on a stud 80 secured to an adjacent part of the work holder 47.

When gears of different diameters or different pressure angles are to be ground, different formers are used. The mode of applying the combined gear segment and former permits ready removal thereof and substitution of other similar elements having a like gear segment part and a different former. But when the gear tooth faces and the former are true involutes, the same former may be used to control all work pieces of which the tooth faces are involutes of the same base circle as the former, notwithstanding differences of the pitches of the respective gears.

The abutment is adjustable angularly about an axis parallel to the axis of the work spindle to bring its face parallel to the plane of the grinding wheel base, and is adjustable longitudinally (transverse to said plane) to feed the work for causing the required amount of stock to be removed by successive cuts. It is also readily removable for resurfacing of its contact face when worn. It is therefore preferably formed as a plate or block 81, the end face of which provides the abutting or contact face, detachably secured by screws 82 to a bar 83 which is seated between the webs of a longer channel bar or beam 84 and connected thereto by a pivot 85. The beam 84 is of massive construction and is supported at its ends by massive links 86 and 87, to which it is connected by pivots 88 and 89, said links in turn being connected to brackets on the base structure by pivots 90 and 91, respectively. The angular adjustments of the abutment are made by a wedge 92 underlying the end of the bar 83 remote from the pivot 85 and connected to a stem 93 which extends toward the front of the machine through a guide 94 on the beam 84, and has a nut 95 on its protruding threaded end abutting against the guide and located in a position where it is accessible for manipulation. The part of bar 83 which bears on the wedge 92 is preferably complementally inclined and is held against the same by a screw 96 passing through the bar and through a slot in the wedge and threaded into the beam 84. Evidently, by shifting the wedge and tightening or loosening the screw 96 as may be required, the face of the abutment may be tilted and shifted bodily through the small angle and distance needed for the purpose. When the contact face of the abutment has been worn to the limit of capacity for compensation afforded by the adjustment, the abutment is removed, ground true, and replaced.

Adjustments of the abutment to feed the work for depth of cut are made by movements of the beam 84 to the left (with respect to Fig. 1) under control of a cam or eccentric 97 and a regulating cam 98 (Figs. 1, 5, 6 and 7). The eccentric 97 is formed on a shaft 99 held in bearings 100 and 101 in the link 86, and carries a roll 102 which bears against a screw stop 103 adjustably mounted on a part of the machine base. The roll is held against this stop by a helical spring 104, secured at one end to the base frame, the other end of which presses outwardly through a plate against a screw stop 105 adjustably mounted on the link 87. The spring holds the roll in contact with the stop 103 and takes up all looseness in the joints between the bar 84 and its supporting links, causing the bar to move when the eccentric 97 is turned so as to bring its receding portion opposite the stop 103 and permitting it to move in the opposite direction when the eccentric is turned the other way.

An arm 106 is secured to the shaft 99 of the eccentric and carries a stud 107 equipped with a roll which bears on the cam 98 and is drawn against the same by a spring 109. The cam 98 is affixed and keyed to a shaft 110 which is mounted in a bearing 111 in the link 86 and carries a head or disk 112 by which it may be manually turned. The cam is of volute form with shallow notches in its surface to receive the roll and prevent accidental displacement of the cam due to vibrations of the machine. In the arrangement here shown, the high part of the cam supports the arm 106 in the position where the most prominent part of the eccentric 97 is opposite the stop screw 103. Hence when the cam is turned clockwise with respect to Figs. 1 and 7, it allows the arm 106 to descend and the cam 97 to be turned so as to permit movement of the beam 84 to the left under the impulsion of spring 104. The abutment 73 is moved with the beam 84 and allows the former 72 to be turned about its axis under the pull of weight 74, thereby turning the work so as to feed it up to the grinding wheel. By suitably designing the eccentric 97 and cam 98, a sufficient depth feed may be given to the work for removing all of the stock which is required to be removed by grinding, and this depth feed may be divided into short steps. A very fine and accurate adjustment is thus provided, enabling the work to be ground to required size with the utmost nicety. The manual adjustment of cam 98 allows the total amount of material required to be removed from the work to be cut away in one or more preliminary cuts of any desired depth and a final light finishing cut.

The mounting of the beam 84 which carries the former abutment in the manner above described reduces to the minimum the frictional resistance to its displacement for adjustment and enables its movements when adjusted to take place instantly and in exact proportion to the recession or advance of the eccentric. That is, there is no liability of the abutment carrier sticking and failing to move when one or more slight movements of the adjustment controller are made, and then becoming suddenly released from frictional detention and moving a distance equal to the sum of all the movements of the controller when the latter is given a further slight increment of movement. In a machine of this character where the desired results require adjustments so minute as to be imperceptible to the senses, the uncertainty and variableness of the adjustments due to sticking of the parts requiring to be adjusted have serious results in impairment of accuracy of the work. The phase of the invention now just described avoids these causes of defect and error.

It is part of my object to stop the grinding action of the machine after a certain number of grinding cuts have been taken. In order that such stoppage may be effected quickly and the grinding action resumed with the minimum expenditure of force and time in getting the machine under way again, I cause the stoppage to take place by releasing the normally stationary internal or sun gear 18, and do not stop the main shaft 3 or shift the belt which drives such shaft. Owing to the fact that the frictional resistance to rotation of the block 9, by which the internal gear 18 is carried, is much less than the frictional resistance opposed by the block 20 and the train of more or less massive moving parts driven thereby, releasing of the block 9 has the effect of causing the latter to be rotated by the planet pinion 16 while the resistance of the parts driven by the gear body 20 causes these parts to come to rest. Release of the block 9 is caused by displacing the detent 12 out of the way of the shoulder 13, which it normally obstructs. The shaft 14 which carries said detent extends to the front of the machine base, where it protrudes and carries an arm 122 normally held in a raised position by a spring 123 connected to the arm and to a fixed point on the base. This arm is coupled by a link 124 to a lever 125 pivoted to the lower part of the base and terminating in a treadle arm 126 for depression by the operator's foot or otherwise. Arm 122 carries a pivot stud 127 on which there is pivoted a lever 128 having a projecting lug or finger 129 and a forwardly projecting handle 130 for manual operation to depress arm 122. That part of the lever from which the finger 129 and arm 130 project rests on the upper side of arm 122 and is rigidly supported thereby, wherefore it is effective to transmit pressure to and from the arm 122. The finger 129 underlies the rim of a disk 131 which is circular in outline, except for a single notch 132, shown in Fig. 12. This disk is loosely mounted on a shaft 133, being retained by a nut 133ᵃ on the end of the shaft, and carries a stud 134 which projects into a notch 135 in the circumference of a head 136 which is keyed or otherwise removably fastened on the shaft 133. A spring 137 is coiled about the head 136 and anchored at its opposite ends in the head and the disk 131, respectively, and it tends to drive the disk in the same direction as the shaft, which is that shown by the arrow 138 shown in Fig. 12 and, in advance of the head, but the breaking effect of the finger on the rim of the disk causes the latter to lag until the shoulder 139 at one end of the notch 135 presses on the stud 134 and drives the disk forward.

Shaft 133 carries a gear 140 (Figs. 8 and 9) in mesh with an idle gear 141, which latter meshes in turn with a pinion 142 on a shaft 143, to which is connected a ratchet wheel 144. Shaft 143 rotates in a quill 145 held fast in a part of the machine frame, and on this quill is mounted oscillatively a pawl carrier 146 having an arm 147 to which is pivoted a pawl 148 arranged to drive the ratchet wheel. The pawl carrier is coupled by a connecting rod 149 with a lug or arm 150 on the oscillative work carrier.

There is also rotatably mounted on the quill a collar 151 forming a shield holder carrying a shield 152 overlying a part of the circumference of the ratchet wheel and adapted to be placed where it will lift and hold the pawl out of engagement with the ratchet wheel teeth during a greater or less proportion of the movement of the pawl. The shield holder carries also a projection 153 serving as a handle for moving the shield and also as a socket to contain a spring pressed locking pin 154 and its spring 155, such pin being pressed toward the surface of the quill and having a bluntly tapered end adapted to enter shallow depressions in such surface to lock the shield holder and shield in various positions wherein it will limit the engagement of the pawl with the ratchet as desired. The pawl swings at each oscillation over several teeth of the ratchet, but may be caused, according to the placement of the shield, to engage each tooth in turn, or every second or every third tooth, etc., to move the ratchet through longer or shorter steps. The blunt formation of the locking pin enables it to be withdrawn by wedging action from the sockets when force is applied to move the shield about the quill, but it affords a sufficiently secure lock to prevent accidental displacement.

The stop motion is operated in any event in the course of a single rotation of the shaft 133. The timing of this shaft to suit the number of teeth in the gear being ground is controlled by making the gear 140 interchangeable with larger or smaller gears having more or fewer teeth. Thus the gear 140 is a changeable timing gear of which the number of teeth bears a definite relation to the number of teeth in the gear to be ground. It may have the same number as the gear to be ground or a multiple of this number, preferably two or three times as many. In the broad sense, the changeable gear 140 contains a multiple of the number of the teeth in the work piece in any event, for when it contains the same number of teeth the multiple is unity. The gear 141 is mounted in an adjustable manner to accommodate such interchangeable gears. As here shown, it is mounted to turn on a stud 156 projecting from a holder bar 157 having a slot 158 to pass over a pivot 159 rigidly mounted in a web 160 which projects from the machine base. The holder 157 may be swung about the pivot 159 and also moved endwise as required to bring the idle gear into mesh with any one of the changeable gears 140 and with the pinion 142 at the same time. Fig. 10 shows its position when a very small gear 140ª is applied to the shaft 133. It may be noted in passing that the shaft 133 is suitably mounted in a bearing sleeve 161 and the quill 145 is mounted in a sleeve 162, both formed in a bracket structure 160 which is either integral with, or is applied and suitably secured to the base of the machine.

The machine is designed to operate automatically until all the teeth of the work piece have been ground one or more times and then to stop. Whether stoppage will occur after one or a repeated number of grindings of all the teeth of the work depends on the setting of the shield 152, for the ratchet wheel 144 has so many teeth that a number of oscillations of the work carrier two or more times as great as the number of teeth in the work piece are required to drive the ratchet far enough to stop the machine, when the shield is adjusted to cause the pawl to engage each tooth of the ratchet in turn and when a change gear 140 having the proper relation to the work is used. When the disk 131 has thus been advanced until the forward boundary of its notch 132 passes the finger 129, the spring 123 raises the arm 122 and the detent 12, leaving the normally stationary sun gear 18 free to rotate and disabling it as the abutment necessary to take the reaction of the forces applied in oscillating the work holder and rolling the work piece. The work holder then comes to rest. In order to start the machine again, the operator depresses either the treadle 126 or the handle 130, thus obstructing the block 9 again and withdrawing the finger 129 from notch 132. The restraining disk 131 is thereby released and it is advanced by the spring 137 to bring its unbroken surface over the finger 129 and restrain the latter so as to prevent stoppage of the machine again until the notch in the disk has again arrived beside the finger.

If the teeth of the work piece have not been ground down to the required size, the operator before starting the machine again adjusts the depth feed by turning the primary control cam 98, making a further similar adjustment after each stoppage of the machine until the work has been brought to the proper finished size.

In the preceding description, reference has been made to grinding all of the teeth in the work piece in succession one or more times. To operate on the teeth successively requires an indexing mechanism operative to turn the work piece after each back and forth movement of the work holder, far enough to bring another tooth into the position of the one last previously ground. For the purpose of thus indexing the work, I may employ various means; and I prefer to employ the indexing mechanism disclosed in my prior application for Letters Patent of the United States filed August 6, 1926, Serial No. 127,565. I have shown in these drawings illustratively an embodiment of said mechanism adapted to this machine. A stationary bracket 164 is mounted on a part of the base frame and carries a pivoted block 165 which occupies a guideway in a guide member 166 forming part of a link 167 which is coupled to an arm 168, said arm being mounted on one of the shafts of the indexing mechanism in the housing 42. With each swing of the work carrier in each direction, the guide 166 travels past the block 165, and is restrained or arrested thereby and by the engagement therewith of stops 169 and 170, causing the work to be indexed in the same manner as described in my prior application aforesaid.

In order to adapt the machine for grinding helical gears or the helical faces of gear shaper cutters, the grinding wheel is mounted adjustably so that it may be turned angularly about an axis which is in the plane of its active face, coincides with the diameter of such face, and is perpendicular to the work spindle. To permit of such adjustment the wheel holder 64, its pivot 65, and the supporting cam 66, with the bearing and operating mechanism for the latter, are mounted in a box or sub frame 171, which is supported by a web 172 forming a part of the main frame and is connected thereto by a pivot 173. Such pivot establishes the axis above defined. A clamp screw 174 secures the adjustments so given to the grinding wheel. Such adjustments to a small degree out of parallelism with the axis of the work spindle, are made when the machine is organized to grind gear shaper cutters in order to back off the sides of the teeth thereof to give plenty of clearance. The arrangement of the driving belt for the grinding wheel here shown permits such adjustments through the small angles required for grinding such cutters; but for grinding gears where a much greater angular displacement of the cutter is required, other arrangements of driving belt, understood by machine designers, or other means for driving the grinding wheel may be used, for instance, such means as are illustrated in my prior Patent No. 1,504,223, dated August 12, 1924.

For dressing the grinding wheel from time to time as required, I have provided a dressing or truing tool 175 mounted on an arm 176 in position to sweep across the operative face of the grinding wheel. Said arm is secured to a shaft mounted in the wheel holding box or frame 171 and carrying a gear segment 177 in mesh with a pinion 178 on a shaft 179, also mounted in the same box or frame. The dressing tool is manually operated by means of wrench or crank applied to the exposed end of shaft 179.

At a previous point in this specification, in describing the location of the face of the abutment with reference to the grinding wheel, I have stated it to be parallel with the plane of the face of the wheel. This definition is strictly accurate only when the grinding wheel is set to grind straight spur gears. When the grinding wheel is inclined for helical gears, its face makes an angle with the plane in which the face of the abutment lies. But in that event the abutment face is in a plane parallel to the axis about which the wheel is adjusted, and in all events it is parallel to that radius or diameter of the face of the wheel which is perpendicular to the axis of the work. This is the vertical radius of the wheel in the case of a machine arranged as herein illustrated and designed to be operated with the grinding wheel in a vertical plane and the work spindle horizontal.

This relationship of the abutment is new, irrespective of the manner of mounting the work, i. e., whether on a sliding carriage, as in my Patent No. 1,504,223, or on an oscillative holder as here shown, and so is claimed broadly as one phase of the invention. However, my claim to the combination of an abutment and holder with an oscillatively mounted work carrier, such as here shown, is not limited to the location of the abutment face at one side of the plane of the grinding wheel or the particular radius thereof last defined.

That phase of the invention which consists in providing an oscillative work carrier is one of particular value and has numerous advantages. One is that it permits use of a circular bearing to position the carrier, and thereby enables the carrier to be movably supported with the minimum of frictional resistance to its back and forth movements, while at the same time being positively withheld from lifting movement and substantially free from backlash. Such friction as the circular bearing opposes is more readily overcome by the long leverage through which the force for moving the holder is applied, the point of force application by means of the former and abutment being many times farther distant from the pivot axis than are the complemental surfaces of the bearing. Also roller or ball bearings may be used. Again, the small frictional resistance of the bearing enables the carrier to be made massive and heavy without requiring excessive application of force to move it. Massiveness in this part is of great importance in absorbing the vibrations due to grinding. Still further, the pivotal mounting of the carrier makes possible the provision of a simple support capable of adjustment in the manner previously described.

As shown in the drawing, the pivot center for the oscillative work holder is set back from the plane of the grinding wheel. This causes the work to be oscillated in a path approximating the pressure angle of a rack tooth in mesh with the work. As this path is curved, it does not correspond exactly to the angle of the rack tooth but is a relatively near approximation thereto. However, it is not essential that the pivot center should be thus set back of the wheel, but it may be in the same plane with the wheel without causing any difficulty in grinding gears to the desired effect; and it may be so placed without difficulty by a perfectly obvious modification in the design or position of the support 50, as, for instance, extending the support further to the right with respect to Fig. 2, and shifting the pivot 49 to the right.

It is to be understood that in designating this machine as a gear generating machine, I have not intended to limit the character of the work performed thereby, but include within the definition of the machine so entitled, machines capable of generating curves similar or analogous to gear tooth curves, whether or not the work pieces are gear wheels within the narrowest definition of that term.

What I claim and desire to secure by Letters Patent is:

1. A gear generating machine comprising an oscillative work holder, a work spindle rotatable in said holder, a cutting tool rotatably mounted and having a cutting portion in a plane substantially perpendicular to its axis arranged to enter between the teeth of a gear wheel on said spindle and cut the face of one of such teeth, and means for giving simultaneous movements of rotation to said spindle and oscillation to said holder.

2. A gear generating machine comprising an oscillative work holder, a work spindle rotatably mounted in said holder parallel to the axis of oscillation thereof, a cutting tool located in a normally unchanging position having a cutting portion traveling in a plane perpendicular to its axis of rotation arranged to enter between the teeth of a gear wheel on said spindle and act on the face of one of such teeth, and means for giving simultaneous oscillating movements to the work holder and rotating movements to the work spindle causing the teeth of the work piece to be rolled past the cutting tool.

3. A gear generating machine comprising a movable work holder, a work spindle rotatably mounted in the holder, a cutting tool located in position to act on the tooth faces of a gear mounted on said spindle, means for giving a simultaneous rotary movement to the work spindle and displacement movement to the work holder, said means including, and the movement being controlled by, a stationary abutment and a cooperating former connected with the work spindle and rotatable coaxially therewith, said abutment having a plane surface against which the former coacts, which plane surface is parallel to, but not coincident with, that radius of the operating tool which is perpendicular to the axis of the work spindle.

4. In a gear generating machine having a rotating cutting tool with a substantially plane active face and a rotatable and displaceable work spindle, means for controlling the rotation and displacement of said work spindle comprising a former connected and coaxial with said spindle, said former having a curved face bearing a given relation to the tooth faces to be generated in the work, and a fixed abutment having a plane face against which the former coacts, said abutment face being in a plane parallel to the work spindle axis, but not coincident therewith.

5. In a gear generating machine having a rotating cutting tool with a substantially plane active face and a rotatable and displaceable work spindle, means for controlling the rotation and displacement of said work spindle comprising a former connected and coaxial with said spindle, said former having a curved face bearing a given relation to the tooth faces to be generated in the work, and a fixed abutment having a plane face against which the former coacts, said abutment face being parallel to, and displaced from, the plane established by the work spindle axis and by the line perpendicular to said axis and to the tool axis.

6. In a gear generating machine a work spindle, a work holder or carrier in which said spindle is mounted, a support for said carrier in which the latter is pivotally mounted, and means for adjusting said support in directions transverse to the pivot of said carrier.

7. In a gear generating machine a pivoted work holder support, means for adjusting said support about its pivot, a work holder pivoted to said support at a distance from the pivot of the latter, a work spindle rotatably mounted in said support at a distance from and parallel to both axes, and means for oscillating said spindle and carrier about their respective axes simultaneously, the path in which the spindle is thus moved bodily being substantially perpendicular to that in which the axis of the work holder is moved within the range of adjustment of the work holder support.

8. In a gear generating machine, a frame, a cutting tool arranged to operate in a normally fixed position, a work spindle adapted to carry gears in operative relation to said tool, a carrier or holder for said work spindle, means for imparting a combination of rotary movement to the spindle and displacement movement to the carrier such that the work is rolled with respect to the tool in the manner of a gear rolling in mesh with a conjugate tooth face, and means for adjusting said carrier in directions such as to alter the distance between the axis of the work spindle and tool.

9. In a gear generating machine, a frame, a cutting tool arranged to operate in a normally fixed position, a work spindle adapted to carry gears in operative relation to said tool, a carrier or holder for said work spindle, means for imparting a combination of rotary movement to the spindle and displacement movement to the carrier such that the work is rolled with respect to the tool in the manner of a gear rolling in mesh with a conjugate tooth face, a support for said carrier upon which the carrier moves in the manner set forth, and means for adjusting said support, and therewith the carrier and work spindle, in directions transverse to the axis of the work spindle and to the movements of the carrier.

10. In a machine of the character set forth, a base structure, adjusting means comprising a complemental screw and nut having swivel connection, respectively, with the said support and base structure on axes substantially parallel to the pivot axis of the support, a work carrier pivotally mounted on said support at a distance from the pivot axis thereof, a work spindle mounted in said holder, and mechanism for rotating said spindle and simultaneously oscillating said holder about its pivot in directions transverse to said adjusting screw.

11. A machine of the character described, comprising a base, a cutting tool mounted to rotate in a normally fixed location, a work spindle, a carrier for said spindle pivotally supported on the base to oscillate about an axis parallel to that of the spindle, a former connected with said spindle and rotatable coaxially therewith, a normally fixed abutment against which said former bears, mechanism rotating the former and the work spindle, and yielding means constantly tending to turn the former toward and against the abutment, the line of centers of the carrier axis and work spindle being transverse to the line of action between the former and abutment, whereby the rolling movements of the former cause the carrier to be oscillated.

12. In a machine of the character described having a rotary work spindle, a translative carrier therefor, a stationary abutment, and a former connected with said spindle and bearing on said abutment for causing rotary and translative movement of the spindle, mechanism for imparting rotary movement to the former comprising a gear segment rigidly connected therewith, a rack bar meshing with said segment, a lever connected to said segment, an adjustable crank linked to said lever, and means for revolving said crank.

13. In a machine of the character set forth, a driving shaft, connected planetary pinions having, respectively, different numbers of teeth carried eccentrically by said shaft, internal sun gears conjugate to the respective pinions and also having, respectively, different numbers of teeth, means for holding one of said sun gears normally stationary, the other being rotatable, a crank driven by said other sun gear, a lever linked to said crank, a work spindle, and means driven by said lever for giving a combined movement of rotation and translation to said work spindle.

14. In a machine as set forth in claim 13, means for adjusting the crank pin of said crank to vary the extent of said movements given to the work spindle.

15. In a machine as set forth in claim 13, automatic means for releasing the normally stationary sun gear, said sun gear being otherwise free to rotate and having less resistance to rotation than the other sun gear, whereby its release causes stoppage of the machine.

16. In a machine of the character described, a normally continuously running drive shaft, rigidly connected pinions carried eccentrically by said shaft and having, respectively, different numbers of teeth, rotatably mounted internal sun gears meshing separately with the respective pinions, a stop for obstructing rotary movement of one of said sun gears whereby the other is caused to rotate, a work carrier, a work spindle mounted on said carrier, means driven by the second named sun gear for rotating said spindle and moving said carrier back and forth, and means controlled by the movements of said carrier for releasing said sun gear stop to permit unimpeded rotation of the sun gear normally obstructed thereby, whereby the movements of the work carrier are caused to cease.

17. In a machine of the character set forth, a pivoted and oscillatively movable work carrier, a work spindle rotatably mounted in said carrier, means for simultaneously turning said spindle and moving said carrier, first in one direction and then in the other, stop mechanism for causing cessation of said movements, and means driven by said carrier for actuating said stop mechanism.

18. In a machine of the character set forth, a backwardly and forwardly movable work carrier, a work spindle rotatably mounted in said carrier, means for simultaneously turning said spindle and moving said carrier, first in one direction and then in the other, stop mechanism for causing cessation of said movements, and means controlled by movements of said carrier for actuating said stop mechanism, said last named means comprising a ratchet and pawl mechanism actuated by movements of the carrier, and transmission gearing.

19. In a machine of the character set forth, a backwardly and forwardly movable work carrier, a work spindle rotatably mounted in said carrier, means for simultaneously turning said spindle and moving said carrier, first in one direction and then in the other, stop mechanism for causing cessation of said movements, and means controlled by movements of said carrier for actuating said stop mechanism, said last named means comprising a ratchet and pawl mechanism driven by the movements of the carrier, gearing driven by said ratchet and pawl mechanism including a changeable gear having a number of teeth which is a multiple of the teeth of the gear being generated, and connections through which said gearing actuates said stop mechanism.

20. In a machine of the character set forth, a spindle adapted to carry gears to be generated, a carrier for said spindle movable back and forth, a pawl operated by said carrier, a ratchet arranged to be driven step by step by said pawl, the gearing driven by said pawl including a changeable gear, the number of teeth of which bears a prescribed relation to the number of teeth in the gear being generated, mechanism for moving said spindle and carrier including a stop device adapted to cause action or arrest of said mechanism according as it is in one position or another, and means controlled by the aforesaid gearing for causing said stop to be shifted from one of said positions to the other.

21. In a machine of the character set forth, a spindle adapted to carry gears to be generated, a carrier for said spindle movable back and forth, a pawl operated by said carrier, a ratchet arranged to be driven step by step by said pawl, said pawl being arranged to swing through the angle subtended by several of the ratchet teeth, an adjustable shield for limiting the engagement of the pawl with the ratchet, driving means for the work spindle and carrier including a stop adapted to be shifted for causing the movement of said carrier and spindle to cease, and control means driven by said ratchet for so shifting said stop.

22. In a machine of the character described, a movable work carrier, a work spindle adapted to hold gears to be generated mounted in said carrier, means for shifting said carrier back and forth and rotating said spindle including a planetary differential gear having a rotatable sun gear, the arrest of which causes said mechanism to move the carrier and rotation of which leaves said mechanism inoperative for that purpose, a stop normally arresting said sun gear but adapted to be shifted into a non-arresting position, and means operated by repeated movements of the carrier for causing said stop to be so shifted.

23. In a machine of the character set forth, a backwardly and forwardly movable work carriage, a work spindle mounted rotatably on said carriage, driving mechanism for so shifting said carriage and rotating said spindle, a device shiftable from one position to another for causing, respectively, action or inaction of said driving mechanism, manually controlled means for placing said device in its action causing position, means tending constantly to shift said device into the position which causes inaction of said two occurrences mechanism, a cam member for retaining said mechanism in the action-causing position against the effort of said means to displace it therefrom, and driving means operated by repeated movements of the work carrier for propelling said cam member, the said cam member having provisions for releasing said device when so moved into a given position.

24. A generating machine of the character described having a shiftable work carrier, a work spindle rotatably mounted therein, a former associated with said spindle, an abutment against which said former acts and by its rotary movement causes a controlled movement of the work carrier, and an adjustable linkage supporting said abutment and adjustable to shift the abutment.

25. In a machine as set forth in claim 24, a bar on which the abutment is mounted, parallel pivoted links or rockers to which said bar is pivoted and by which it is supported.

26. A generating machine of the character set forth having a cutting tool, a work spindle, a carrier for said spindle, a former associated with said spindle, and an abutment for taking the reaction of said former, said abutment having a substantially plane reaction face and being adjustable to alter the position and angular relation of said face with respect to the cutting tool.

27. In a gear generating machine including a rotating cutting tool, a work spindle and work spindle carrier, movable to roll the work piece across the cutting tool, a former for controlling the movements of said spindle, an abutment against which said former reacts having a substantially plane contact face approximately parallel to that diameter of the cutting tool which is perpendicular to the work spindle axis, means to adjust the abutment and said contact face angularly, and means to shift the abutment bodily to feed the work.

28. In a generating machine of the character described, a rotating cutting tool, a work spindle, a carrier for said spindle, means for moving said spindle and carrier to cause rolling movements of the work piece relatively to the tool, said means including a former and an abutment having a substantially plane face cooperating with said former, and means for angularly adjusting said abutment to bring its face into a prescribed angular relation to the cutting tool.

29. In a gear generating machine of the character described, a former and an abutment for controlling the movements of the gear being generated, a supporting structure to which said abutment is pivoted, an arm associated with the abutment, and a wedge mounted on said supporting structure engaged with said arm and adjustable relatively thereto for turning the abutment about its pivot so as to alter its inclination relatively to said former.

30. In a machine of the character described, an abutment, a bar to which said abutment is secured, a beam to which said bar is pivoted, a wedge mounted and longitudinally adjustable on said beam engaging a part of said bar, and means for shifting said wedge to turn the bar and abutment about the pivot thereof.

31. In a machine of the character described, an abutment, a beam on which said abutment is mounted, pivoted links to which said beam is pivoted and by which it is carried, a spring acting on one of said links tending to move said links and beam in one direction, and a fixed stop against which the other of said links is forced by said spring.

32. In a machine of the character described, an abutment, a base, a beam carrying said base, parallel links pivoted to said base and carrying said beam, and an adjusting cam and a stop bearing thereon, one of said last named members being mounted on one of the links and the other on the base structure, and a spring acting between said base structure and the other of said links arranged to take up backlash in the linkage and maintain contact between said cam and stop.

33. In a machine of the character described, a parallel motion linkage, an abutment mounted on said linkage, a load-applying means arranged to take up backlash in said linkage, and means for applying force to said linkage in opposition to said load-applying means for shifting the linkage and the abutment.

34. In a machine of the character described, a base structure, a parallel motion linkage pivoted to said base structure, a former-controlling abutment carried by said linkage, an adjusting cam reacting between said linkage and base structure for adjusting the abutment, and load-applying means exerting force on said linkage in a manner to take up backlash between the parts of said linkage, the base structure and said cam.

35. In a machine of the character described, a base structure, a former-controlling abutment, a holder for said abutment movable relatively to the base structure, a feed cam and cooperating stop arranged between said support and base structure for adjusting the abutment, an arm connected to said cam for turning it, and a cam coacting with said arm for giving angular movement thereto.

36. A gear generating machine comprising a support, an oscillative work holder pivoted to said support, a work spindle rotatable in said holder, a cutting tool, a stationary abutment, a former connected with said work spindle and bearing on said abutment, and means for giving oscillative movements to said former and spindle simultaneously, whereby the holder is moved relatively to the cutting tool.

37. A gear generating machine comprising an oscillatively mounted work holder, a work spindle carried rotatably by said work holder, and means for giving simultaneous oscillative movement to the work holder and work spindle about their respective axes, comprising a former and an abutment against which said former bears, said former being mounted to turn with the spindle about theh same axis and coacting with the abutment to cause swinging movements of the holder.

In testimony whereof I have affixed my signature.

EDWIN R. FELLOWS.